United States Patent [19]

Levien

[11] Patent Number: 5,544,258
[45] Date of Patent: Aug. 6, 1996

[54] AUTOMATIC TONE CORRECTION OF IMAGES USING NON-LINEAR HISTOGRAM PROCESSING

[76] Inventor: Raphael L. Levien, Rte. 1, Box 18, P.O. Box 31, McDowell, Va. 24458

[21] Appl. No.: 89,622

[22] Filed: Jul. 12, 1993

Related U.S. Application Data

[63] Continuation of Ser. No. 979,438, Nov. 20, 1992, abandoned, which is a continuation of Ser. No. 669,564, Mar. 14, 1991, abandoned.

[51] Int. Cl.$^6$ .................................................. G06K 9/36
[52] U.S. Cl. ...................... 382/169; 382/274; 358/448; 358/461; 358/522
[58] Field of Search .................. 382/51, 54, 169, 382/274; 358/163, 168, 169, 448, 455, 461, 466, 522, 523, 524; 348/223, 254, 655; H04N 1/40, 5/235, 5/57

[56] References Cited

U.S. PATENT DOCUMENTS

| | | | |
|---|---|---|---|
| 4,353,092 | 10/1982 | Bailey et al. | 358/160 |
| 4,410,909 | 10/1983 | Ueda et al. | 358/75 |
| 4,450,482 | 5/1984 | Ackermann | 358/160 |
| 4,472,736 | 9/1984 | Ushio et al. | 358/75 |
| 4,516,167 | 5/1985 | Dion et al. | 358/160 |
| 4,633,327 | 12/1986 | Roetling | 358/283 |
| 4,677,465 | 6/1987 | Alkofer | 358/80 |
| 4,729,016 | 3/1988 | Alkofer | 358/80 |
| 4,731,671 | 3/1988 | Alkofer | 358/284 |
| 4,792,979 | 12/1988 | Nomura et al. | 382/54 |
| 4,799,106 | 1/1989 | Moore et al. | 358/168 |
| 4,805,016 | 2/1989 | Kato | 358/98 |
| 4,931,864 | 6/1990 | Kawamura et al. | 358/80 |

Primary Examiner—Leo Boudreau
Assistant Examiner—Andrew W. Johns
Attorney, Agent, or Firm—Allan Jacobson

[57] ABSTRACT

A method and apparatus for automatically correcting the tone values of a digitally stored image includes compiling a histogram of the relative occurrence of gray values in the stored image in memory. The histogram is processed by adding a constant, taking the square root, and digital filtering. The processed histogram is numerically integrated and then normalized to form a tone correction function. The present tone correction method may be used to tone correct color images by applying separate tone correction functions generated for each of the three color planes independently, or in the alternative, by applying a composite tone correction function corresponding to the average of histograms of the respective individual color planes. A switch is provided to allow the operator to view the results of both methods of automatic tone correction for color images, and choose the best resulting image.

18 Claims, 6 Drawing Sheets

AUTOMATIC TONE CORRECTION OF IMAGES USING NON-LINEAR HISTOGRAM PROCESSING

This is a continuation of application Ser. No. 07/979,438, filed on Nov. 20, 1992 now abandoned, which is a continuation of application Ser. No. 07/669,564 filed on Mar. 14, 1991 now abandoned.

FIELD OF THE INVENTION

This invention relates to the the field of automatic enhancement of images.

BACKGROUND OF THE INVENTION

In order to enhance stored images it is usually important to do tone correction. The need for tone correction may arise from the conditions in the original image due to limitations of the film or camera. For example, an original image may have low contrast due to underexposure.

The need for tone correction may also arise from the editing process in which portions of an original image are clipped to form a separate image. For example, a clipped image may represent a relatively dark portion of the original image and thus have low contrast as well as being too dark generally.

Typically, tone correction is achieved by the use of one or more tone correction function look up tables. For a black and white photograph, in which the image is stored as set of pixel values representing gray scale values, tone correction is effected by use of a look up table in which each input pixel of the original image is transformed to an output pixel having a corresponding value derived from the tone correction function look up table.

For a color photograph, the image is stored as three sets of pixel values representing corresponding red, green, and blue color planes. In a manner similar to the processing of a black and white image, tone correction of a color image is effected by use of red, green, and blue tone correction function look up tables in which each input pixel of each of the original image color planes is transformed to an output pixel having a corresponding value derived from the corresponding tone correction function look up table.

The problem of tone correction then reduces to the problem of determining the specific tone correction function to use with the image. Manual adjustment systems require time for the operator to manipulate the shape of the tone correction curve until the image looks right. Adjustment time is important in certain applications, such as newspaper publishing, where it may be necessary to edit 100 black and white photographs per hour during peak activity periods. Furthermore, manual adjustment systems require a skilled operator, and the results will vary depending on the skill level of the individual operator.

Automatic tone adjustment systems are well known. A typical prior art automatic tone adjustment system is shown in U.S. Pat. No. 4,931,864 to Kawamura et al. In the prior art, a histogram of gray values from the original image is compiled. Then the resulting histogram data is summed (integrated) and then normalized to extend over the desired range of gray values in order to form the tone correction function.

One difficulty with the prior art automatic tone correction systems is that the resulting tone correction curve may have tone jumps resulting from large areas of similar tone values in the original image. Sharp tone jumps in the tone correction function reduce the effectiveness of automatic tone correction.

In U.S. Pat. No. 4,677,465 to Alkofer, the shape of the histogram data is corrected towards a normal distribution having the same mean and standard deviation as the sample distributions of the original image. However, Alkofer's algorithm, which involves processing the joint probabilities between the actual sample and the normal distribution having the same mean and standard deviation as the actual sample, is not easily implemented, and there remains a need to perform fast and accurate automatic tone correction.

SUMMARY OF THE INVENTION

The present invention is embodied in a method and apparatus for automatically correcting the tone values of a stored image. In accordance with the present invention, a histogram of the gray values of the digitally stored image is compiled in memory. First, a constant is added to the histogram data. Adding a constant prevents areas of the tone correction curve from having no slope at all.

The histogram is further processed by computing a non-linear function of each value, i.e. the square root of each value, and filtering the result prior to integration and normalization, in order to assure that small histogram values have more contribution to the final tone curve, and large histogram values have less contribution to the final tone curve, relatively. Histogram processing in accordance with the present invention provides a tone correction curve with reduced slope, which tends to reduce the occurrence of tone jumps.

The present tone correction method may be used to tone correct color images. In one embodiment, separate tone correction functions are generated for each of the three color planes independently. In a second embodiment, the three histograms for the red, green and blue color planes are averaged to form an average histogram. The average histogram is processed in accordance with the present invention to provide a single composite tone correction function which is used to correct the tone values for each color plane. A switch is provided to allow the operator to view the results of both methods of automatic tone correction, and choose the best resulting image.

DETAILED DESCRIPTION

Figure 1:
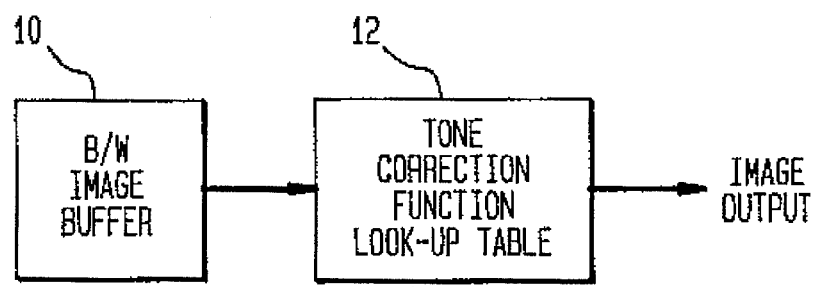
FIG. 1 is a block diagram of a tone correction system for use with the present invention.

A general block diagram of a system employing tone correction of images is shown in FIG. 1, wherein an image buffer 10 containing digital values of pixels corresponding to a stored black and white image, is coupled to a tone correction function lookup table 12. For each pixel value in the image buffer 10, the tone correction function lookup table 12 provides a corrected image output pixel value. The tone correction function may be manually adjusted until the resulting corrected image is pleasing to the operator.

In the prior art, a tone correction function has been automatically calculated by compiling a histogram of the relative occurrences of the various shades of gray in the original image and then numerically integrating the histogram data.

Figure 6:
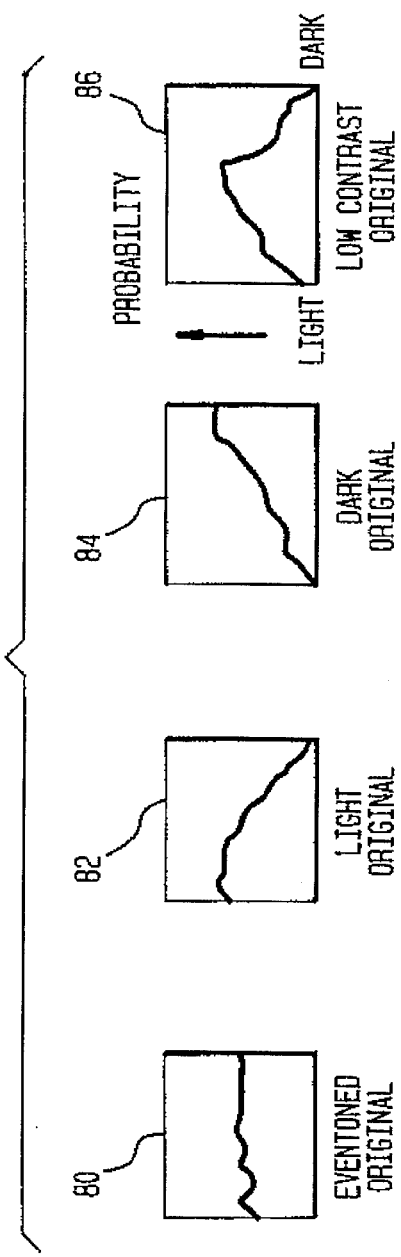
FIG. 6 illustrates typical histograms for different types of original images.

FIG. 6 shows the relationship between various types of original images and the corresponding histograms. Gray value from light to dark is represented on the horizontal axis, and increasing probability of occurrence is represented on the vertical axis. An eventoned original has a somewhat flat histogram 80, whereas a low contrast original has a histogram 86 depicting less light and dark areas, and more intermediate shades of gray. Light or dark originals have a preponderance of light or dark areas respectively, as indicated by respective histograms 82, 84.

Figure 7:
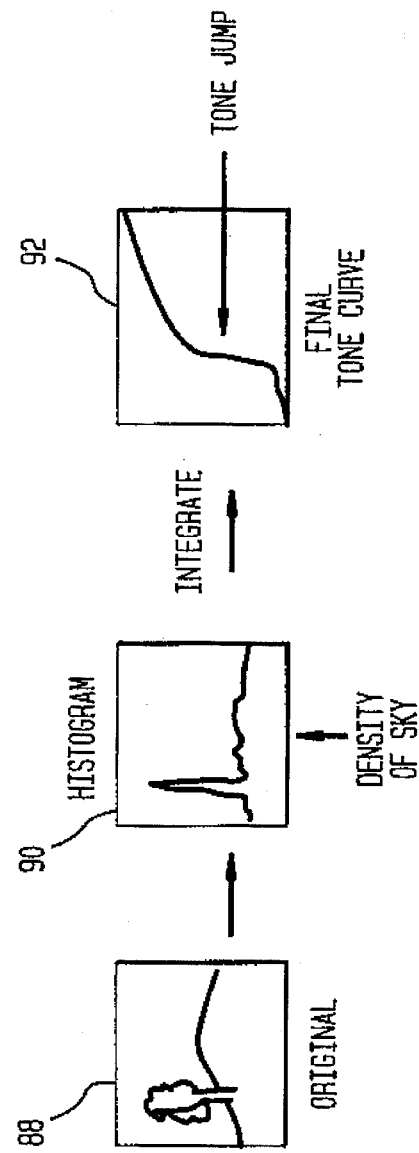
FIG. 7 illustrates the relationship between an original image, the corresponding histogram of gray values, and prior art resulting tone correction curve.

FIG. 7 illustrates a problem which can result from the prior art technique. An original image 88 having a large light sky area produces a peak in the histogram 90 at the density value of the sky. After the histogram is integrated, there is a steep slope, or tone jump, the final tone correction curve 92 which produces undesirable sharp changes in tone in the corrected image.

Figure 8:
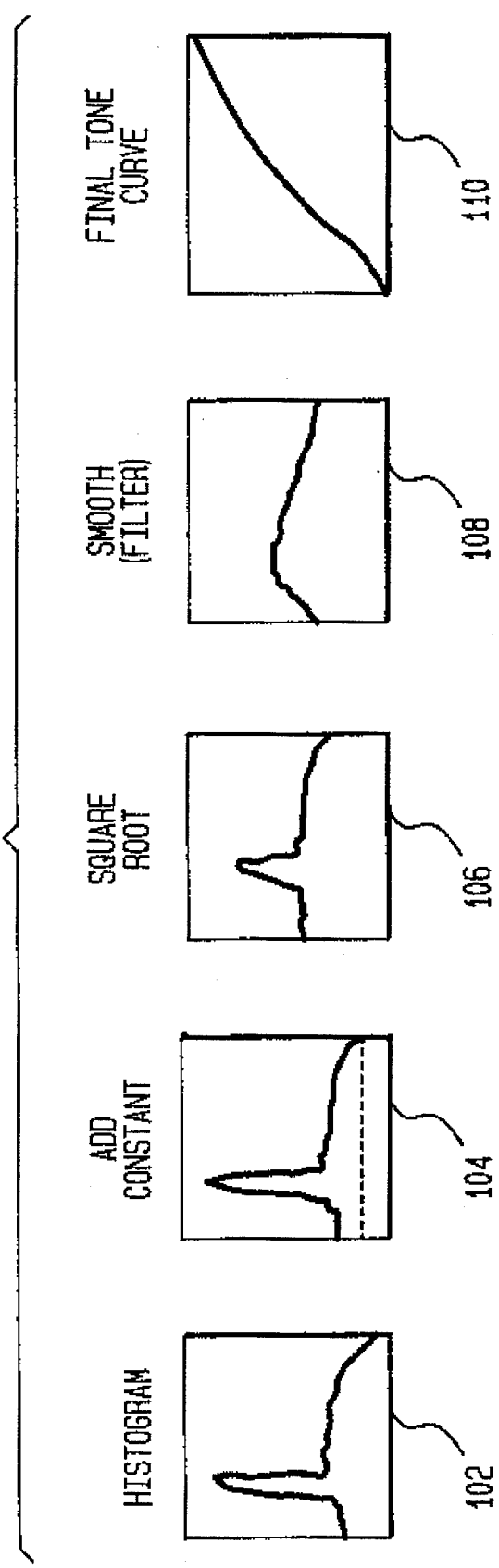
FIG. 8 illustrates histogram processing in accordance with the present invention.

In accordance with the present invention, the peaks in the histogram curve are reduced without giving up the effectiveness of the tone correction function. The steps of histogram processing are illustrated in FIG. 8. First the histogram data 102 is compiled in memory, then a small constant is added to each value 104, which prevents the resulting tone curve from having no slope at all, i.e. flat areas due to the absence of certain tone values from the original image. Since adding a constant reduces the effectiveness of tone correction, it should be kept as small as possible.

Then, a square root function 106 is applied to each value in the partially processed histogram curve. This step is critical to assuring that small histogram values have more contribution, i.e. are more heavily weighted in the final tone curve, and large histogram values have less contribution in the final tone curve, relatively. The square root function is a non-linear function which will produce the foregoing effect. Other types of non-linear functions can be used to achieve the desired relative contribution of the histogram data to the final tone curve. Specifically, histogram data plus a small constant raised to a power between 0 and 1 will effect proper histogram processing. In the embodiment shown, the power is chosen to be one half, i.e. the square root function.

The partly processed histogram is then smoothed by filtering 108. The processed histogram is then numerically integrated, and normalized so that the maximum value is equal to the maximum density that can be reproduced. The resulting curve 110 is then used as the tone correction curve.

Figure 2:
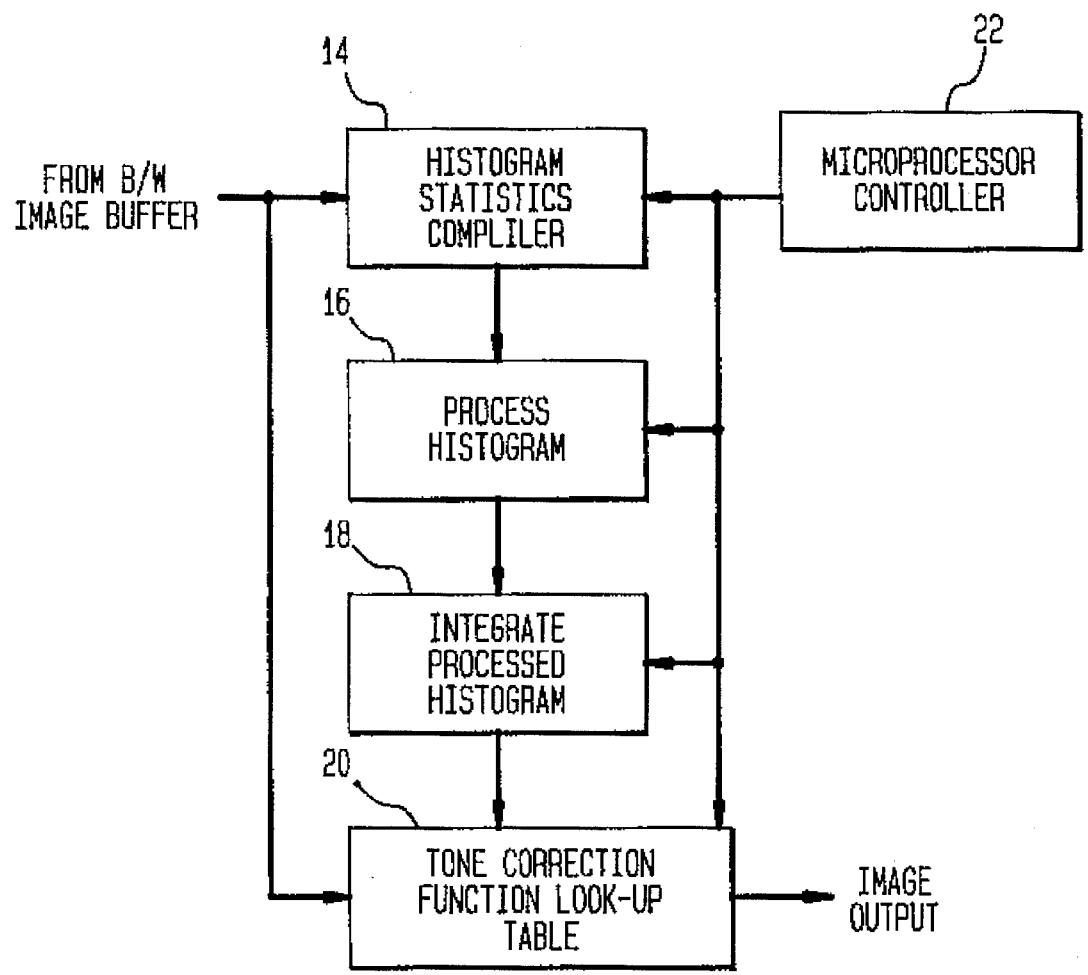
FIG. 2 is a block diagram of a tone correction system for enhancing black and white images in accordance with the present invention.

Apparatus for implementing the present invention is shown in the block diagram of FIG. 2. Under the control of microprocessor 22, histogram statistics compiler 14 derives histogram data from the image buffer data. The histogram is processed 16 in accordance with the flow chart steps in FIG. 3. The stored histogram data 24 has a small constant added at step 26. The square root function is computed at step 28 and filtering is applied at step 30. In reference to FIG. 2, the processed histogram 16 is then integrated 18 and loaded in the tone correction function lookup table 20. Data from the image buffer applied to the tone correction function lookup table 20, produces an automatically tone corrected image output.

Figure 5:
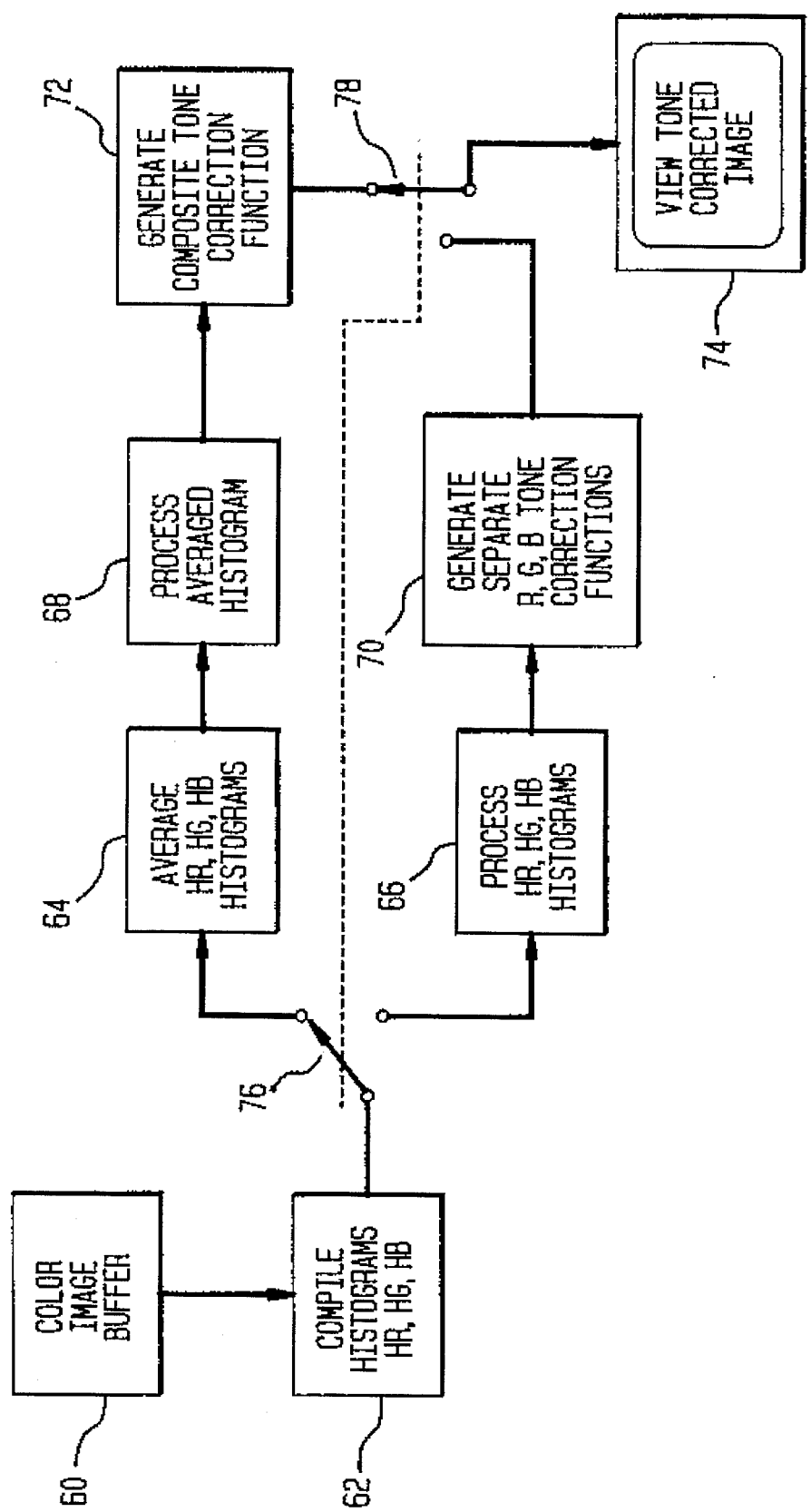
FIG. 5 is a block diagram of a tone correction system for enhancing color images in accordance with the present invention.

An implementation of the filter smoothing step 30 (FIG. 3) is shown in FIG. 5. The operation of the digital filter of FIG. 5 is expressed in the following computer program:

t:=hist(0)

for i:=0 to 256−1

$$hist(i):=t+0.125*(hist(i)-t)$$

t:=hist(i)

next for i:=256−1 to 0 step −1

$$hist(i):=t+0.125*(hist(i)-t)$$

t:=hist(i)

next where, hist is the histogram table i is the loop index t is a temporary variable that holds an average hist value 256 is the number of elements in the histogram table, and 0.125 is a smearing factor. A smaller value would result in more smearing. The value 0.125 is optimum and easy to implement. Since 0.125 is equal to ⅛, multiplication by 0.125 may be accomplished by dividing by 8, which is a 3 bit shift right relative to the binary point.

Figure 4:
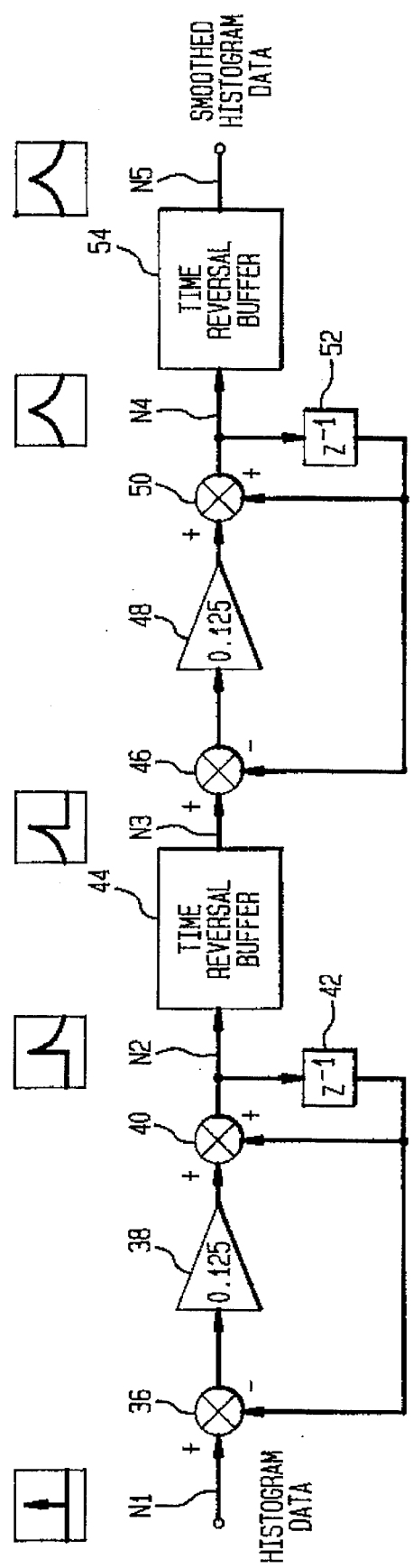
FIG. 4 is a digital filter embodiment of the filter smoothing step shown in FIG. 3 in accordance with the present invention.

The digital filter may be implemented in hardware or software. A hardware equivalent of the above program is shown in FIG. 4. The circuit in FIG. 4 is equivalent to filtering histogram data in two stages, each stage comprising a low pass filter, and a time reversal buffer. A time reversal buffer is a memory which reverses the time sequence of any received signal as an output signal. The first low pass filter smears an input signal asymmetrically in one direction. The use of a time reversal buffer and a second low pass filter smears the signal in the reverse direction so as to result in symmetrical smearing of the histogram data.

A first low pass filter comprises adders 36, and 40, multiplier 38 having a gain of 0.125, and a one sample delay element 42. A second low pass filter comprises adders 46, 50, multiplier 48 having a gain of 0.125, and a one sample delay element 52. Time reversal buffers 44, 54 are digital time reversal buffers, and the circuit nodes N1, N2, N3, N4 and N5 illustrate the digital signals present at the corresponding nodes in FIG. 4.

The operation of the smoothing filter may be understood by the illustrations of the signals at circuit nodes N1, N2, N3, N4 and N5. For an impulse input at N1, the output of the first low pass filter is an exponential decay at N2. The time reversal buffer 44, reverses the signal as shown at N3. The result is again passed through a second low pass filter and time reversal buffer 54 to produce a symmetrical smearing of the original input signal at N4 and N5 respectively. The use of time reversal buffers 44, 54 for histogram filter smoothing permits low pass filtering to be used without any resulting phase shift.

In operation, the partially processed histogram data is applied to the filter input at node N1. The smoothed histogram output data is at node N5 at the output of time reversal buffer 54.

A tone correction system for use with color images in accordance with the present invention is shown in FIG. 5. A color image buffer 60 contains three independent stored image planes, one for each of the color planes of red, green and blue. Histograms, HR, HG, HB are compiled for each of the red, green and blue color planes at step 62. Two alternate branches of automatic tone correction are applied to the histograms. Coupled switches 76 and 78 are shown symbolically to indicate the selection of alternate processes. In one position, switches 76 and 78 select steps 66 and 70 for automatic tone correction, while in the other position steps 64, 68, and 72 are selected.

Figure 3:
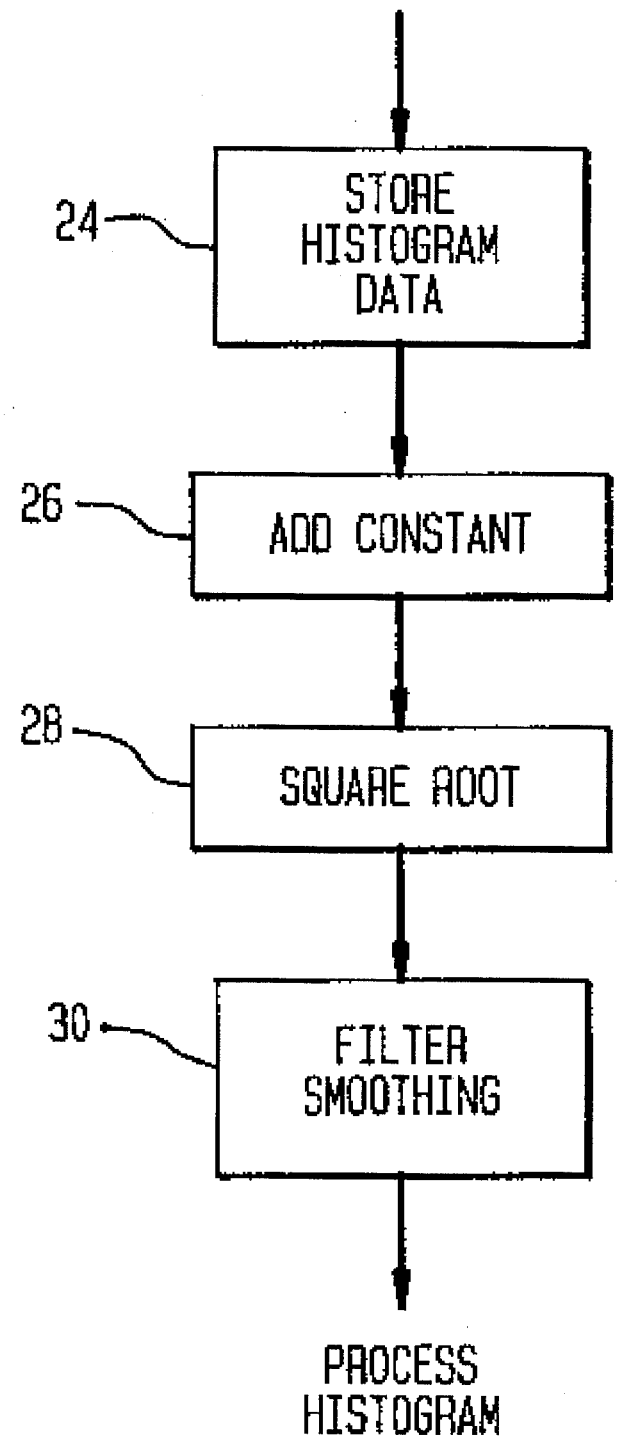
FIG. 3 is flow chart diagram of histogram processing embodying the present invention.

At step 66 histograms HR, HG, and HB are individually processed in the same manner as indicated in FIG. 3 for black and white images. Separate R, G, and B correction functions are generated at the step 70, and a tone corrected color image is viewed on monitor 74. In the latter case, each stored image plane is processed in the same manner as a black and white image, in the sense that a stored image plane can be any color including shades of gray values.

Alternatively, in the other position of coupled switches 76 and 78, histograms HR, HG, and HB are combined to form an average histogram at step 64. The average histogram is then processed in the same manner as indicated in FIG. 3 for black and white images. A composite tone correction is generated at step 72, and the same composite tone correction function is used to process each of the red, green and blue color planes. A tone corrected color image is viewed in monitor 74.

In operation, the viewer alternatively selects both of the forgoing processes, and selects one process on the basis of the preferred result. The system of the present invention also may be used with other types of color systems, such as cyan, magenta, and yellow.

What is claimed is:

1. In an automatic tone correction system wherein a stored image plane including a plurality of pixels, is processed by applying a tone correction function to each pixel of said stored image plane, a method of generating a tone corrected image from said stored image, comprising the steps of:

compiling a histogram of the relative occurrence of tone values corresponding to said stored pixels of said stored image plane;

processing said histogram with a non-linear function so that small histogram values have relatively more contribution to said tone correction function, and large histogram values have relatively less contribution to said tone correction function, said non-linear function comprising raising each histogram value to a power between 0 and 1;

numerically integrating said processed histogram;

normalizing said numerically integrated histogram to extend over the desired range of tone values in interest in order to form said tone correction function;

storing said tone correction function in a lookup table memory; and applying said stored plurality of pixels of said stored image plane in said memory to said lookup table memory to provide a plurality of tone corrected image output pixels from said lookup table memory corresponding to said tone corrected image.

2. A method in accordance with claim 1, further comprising:

filtering said histogram to smooth out the peaks of said histogram.

3. A method in accordance with claim 1, further comprising:

adding a constant to said histogram.

4. In an automatic tone correction system wherein a stored image plane including a plurality of pixels, is processed by applying a tone correction function to each pixel of said stored image plane, a method of generating a tone corrected image from said stored image, comprising the steps of:

compiling a histogram of the relative occurrence of tone values corresponding to said stored pixels of said stored image plane;

processing said histogram with a non-linear function so that small histogram values have relatively more contribution to said tone correction function, and large histogram values have relatively less contribution to said tone correction function, wherein said processing step further comprises computing the square root of each of said histogram values;

numerically integrating said processed histogram;

normalizing said numerically integrated histogram to extend over the desired range of tone values in interest in order to form said tone correction function;

storing said tone correction function in a lookup table memory; and applying said stored plurality of pixels of said stored image plane in said memory to said lookup table memory to provide a plurality of tone corrected image output pixels from said lookup table memory corresponding to said tone corrected image.

5. In an automatic tone correction system wherein a stored image plane is processed by applying a tone correction function to each pixel of said stored image plane, a method of generating a tone corrected image from said stored image, comprising the steps of:

scanning a photographic image to provide a plurality of pixels corresponding to an image plane;

storing said plurality of pixels of said image plane in a memory;

compiling a histogram of the relative occurrence of tone values corresponding to said stored pixels of said stored image plane;

processing said histogram with a non-linear function so that small histogram values have relatively more contribution to said tone correction function, and large histogram values have relatively less contribution to said tone correction function;

numerically integrating said processed histogram;

normalizing said numerically integrated histogram to extend over the desired range of tone values in interest in order to form said tone correction function;

filtering said histogram to smooth out the peaks of said histogram, wherein said step of filtering said histogram further comprises:
   filtering said histogram in a first low pass filter;
   storing the output of said first low pass filter in a first time reversal buffer;
   filtering the output of said first time reversal buffer in a second low pass filter; and
   storing the output of said second low pass filter in a second time reversal buffer;

storing said tone correction function in a lookup table memory;

applying said stored plurality of pixels of said image plane in said memory to said lookup table memory to provide a plurality of tone corrected image output pixels from said lookup table memory corresponding to a tone corrected image; and displaying said tone corrected image on a display device.

6. In an automatic tone correction system wherein a stored image plane including a plurality of pixels, is processed by applying a tone correction function to each pixel of said stored image plane, a method of generating a tone corrected image from said stored image, comprising the steps of:

compiling a histogram of the relative occurrence of tone values corresponding to said stored pixels of said stored image plane;

processing said histogram, said histogram processing comprising:

adding a constant to said histogram;

processing said histogram with a non-linear function so that small histogram values have relatively more contribution to said tone correction function, and large histogram values have relatively less contribution to said tone correction function, said non-linear function comprising raising each histogram value to a power between 0 and 1; and filtering said histogram to smooth out the peaks of said histogram;

numerically integrating said processed histogram;

normalizing said numerically integrated histogram to extend over the desired range of tone values in interest in order to form said tone correction function;

storing said tone correction function in a lookup table memory; and applying said stored plurality of pixels of said stored image plane in said memory to said lookup table memory to provide a plurality of tone corrected image output pixels from said lookup table memory corresponding to said tone corrected image.

7. In an automatic tone correction system wherein a stored image plane including a plurality of pixels, is processed by applying a tone correction function to each pixel of said stored image plane, a method of generating a tone corrected image from said stored image, comprising the steps of:

compiling a histogram of the relative occurrence of tone values corresponding to said stored pixels of said stored image plane;

processing said histogram, said histogram processing comprising:

adding a constant to said histogram;

processing said histogram with a non-linear function so that small histogram values have relatively more contribution to said tone correction function, and large histogram values have relatively less contribution to said tone correction function comprising computing the square root of each tone value; and filtering said histogram to smooth out the peaks of said histogram;

numerically integrating said processed histogram;

normalizing said numerically integrated histogram to extend over the desired range of tone values in interest in order to form said tone correction function;

storing said tone correction function in a lookup table memory; and applying said stored plurality of pixels of said stored image plane in said memory to said lookup table memory to provide a plurality of tone corrected image output pixels from said lookup table memory corresponding to said tone corrected image.

8. In an automatic tone correction system wherein a color image is stored in the form of a plurality of color planes, said color image being processed by applying a tone correction function to each pixel of said stored color planes, a method of generating a tone corrected image from said stored image, comprising the steps of:

compiling a histogram of the relative occurrence of tone values corresponding to said stored pixels of each of said color planes of said color image;

averaging said plurality of histograms to form a composite histogram;

processing said composite histogram with a non-linear function so that small histogram values have relatively more contribution to said tone correction function, and large histogram values have relatively less contribution to said tone correction function, said non-linear function comprising raising each histogram value to a power between 0 and 1;

numerically integrating said processed histogram;

normalizing said numerically integrated histogram to extend over the desired range of tone values in interest in order to form said tone correction function;

storing said tone correction function in a lookup table memory; and applying said stored plurality of pixels of one of said color planes in said memory to said lookup table memory to provide a plurality of tone corrected image output pixels from said lookup table memory corresponding to said tone corrected image.

9. In an automatic tone correction system wherein a color image is stored in the form of a plurality of color planes, said color image being processed by applying a tone correction function to each pixel of said stored color planes, a method of generating a tone corrected image from said stored image, comprising the steps of:

compiling a histogram of the relative occurrence of tone values corresponding to said stored pixels of each of said color planes of said color image;

averaging said plurality of histograms to form a composite histogram;

processing said composite histogram with a non-linear function so that small histogram values have relatively more contribution to said tone correction function, and large histogram values have relatively less contribution to said tone correction function, wherein said processing step further comprises computing the square root of each tone value;

numerically integrating said processed histogram;

normalizing said numerically integrated histogram to extend over the desired range of tone values in interest in order to form said tone correction function;

storing said tone correction function in a lookup table memory; and applying said stored plurality of pixels of said color plane in said memory to said lookup table memory to provide a plurality of tone corrected image output pixels from said lookup table memory corresponding to said tone corrected image.

10. In an automatic tone correction system wherein a stored image plane including a plurality of pixels, is processed by applying a tone correction function to each pixel of said stored image plane, an apparatus for generating a tone corrected image from said stored image, comprising:

means for compiling a histogram of the relative occurrence of tone values corresponding to said stored pixels of said stored image plane;

means for processing said histogram with a non-linear function so that small histogram values have relatively more contribution to said tone correction function, and large histogram values have relatively less contribution to said tone correction function, said non-linear function comprising raising each histogram value to a power between 0 and 1;

means for numerically integrating said processed histogram;

means for normalizing said numerically integrated histogram to extend over the desired range of tone values in interest in order to form said tone correction function;

means for storing said tone correction function in a lookup table memory; and means for applying said stored plurality of pixels of said stored image plane in said memory to said lookup table memory to provide a plurality of tone corrected image output pixels from said lookup table memory corresponding to said tone corrected image.

11. An apparatus in accordance with claim 10, further comprising:

means for filtering said histogram to smooth out the peaks of said histogram.

12. An apparatus in accordance with claim 10, further comprising:

means for adding a constant to said histogram.

13. In an automatic tone correction system wherein a stored image plane including a plurality of pixels, is processed by applying a tone correction function to each pixel of said stored image plane, an apparatus for generating a tone corrected image from said stored image, comprising:

means for compiling a histogram of the relative occurrence of tone values corresponding to said stored pixels of said stored image plane;

means for processing said histogram with a non-linear function so that small histogram values have relatively more contribution to said tone correction function, and large histogram values have relatively less contribution to said tone correction function, said means for processing said histogram further comprises means for computing the square root of each of said histogram values;

means for numerically integrating said processed histogram;

means for normalizing said numerically integrated histogram to extend over the desired range of tone values in interest in order to form said tone correction function;

means for storing said tone correction function in a lookup table memory; and means for applying said stored plurality of pixels of said stored image plane in said memory to said lookup table memory to provide a plurality of tone corrected image output pixels from said lookup table memory corresponding to said tone corrected image.

14. In an automatic tone correction system wherein a stored image plane is processed by applying a tone correction function to each pixel of said stored image plane, an apparatus for generating a tone corrected image from said stored image, comprising:

means for scanning a photographic image to provide a plurality of pixels corresponding to an image plane;

means for storing said plurality of pixels of said image plane in a memory;

means for compiling a histogram of the relative occurrence of tone values corresponding to said stored pixels of said stored image plane;

means for processing said histogram with a non-linear function so that small histogram values have relatively more contribution to said tone correction function, and large histogram values have relatively less contribution to said tone correction function;

means for numerically integrating said processed histogram;

means for normalizing said numerically integrated histogram to extend over the desired range of tone values in interest in order to form said tone correction function;

means for filtering said histogram to smooth out the peaks of said histogram, wherein said means for filtering said histogram further comprises:
  means for filtering said histogram in a first low pass filter;
  means for storing the output of said first low pass filter in a first time reversal buffer;
  means for filtering the output of said first time reversal buffer in a second low pass filter; and
  means for storing the output of said second low pass filter in a second time reversal buffer;

means for storing said tone correction function in a lookup table memory;

means for applying said stored plurality of pixels of said image plane in said memory to said lookup table memory to provide a plurality of tone corrected image output pixels from said lookup table memory corresponding to a tone corrected image; and means for displaying said tone corrected image on a display device.

15. In an automatic tone correction system wherein a stored image plane including a plurality of pixels, is processed by applying a tone correction function to each pixel of said stored image plane, an apparatus for generating a tone corrected image from said stored image, comprising:

means for compiling a histogram of the relative occurrence of tone values corresponding to said stored pixels of said stored image plane;

means for processing said histogram, said histogram processing comprising:
  means for adding a constant to said histogram; and
  means for processing said histogram with a non-linear function so that small histogram values have relatively more contribution to said tone correction function, and large histogram values have relatively less contribution to said tone correction function, said non-linear function comprising raising each histogram value to a power between 0 and 1; and
  means for filtering said histogram to smooth out the peaks of said histogram;

means for numerically integrating said processed histogram;

means for normalizing said numerically integrated histogram to extend over the desired range of tone values in interest in order to form said tone correction function;

means for storing said tone correction function in a lookup table memory; and means for applying said stored plurality of pixels of said stored image plane in said memory to said lookup table memory to provide a plurality of tone corrected image output pixels from said lookup table memory corresponding to said tone corrected image.

16. In an automatic tone correction system wherein a stored image plane including a plurality of pixels, is processed by applying a tone correction function to each pixel of said stored image plane, an apparatus for generating a tone corrected image from said stored image, comprising:

means for compiling a histogram of the relative occurrence of tone values corresponding to said stored pixels of said stored image plane;

means for processing said histogram, said histogram processing comprising:

means for adding a constant to said histogram;

means for processing said histogram with a non-linear function so that small histogram values have relatively more contribution to said tone correction function, and large histogram values have relatively less contribution to said tone correction function comprising means for computing the square root of each tone value; and means for filtering said histogram to smooth out the peaks of said histogram;

means for integrating said processed histogram;

means for normalizing said numerically integrated histogram to extend over the desired range of tone values in interest in order to form said tone correction function;

means for storing said tone correction function in a lookup table memory; and means for applying said stored plurality of pixels of said stored image plane in said memory to said lookup table memory to provide a plurality of tone corrected image output pixels from said lookup table memory corresponding to said tone corrected image.

17. In an automatic tone correction system wherein a color image is stored in the form of a plurality of color planes, said color image being processed by applying a tone correction function to each pixel of said stored color planes, an apparatus for generating a tone corrected image from said stored image, comprising:

means for scanning a photographic image to provide a plurality of pixels corresponding to each of said color planes;

means for storing said plurality of pixels corresponding to each of said color planes in a memory;

means for compiling a histogram of the relative occurrence of tone values corresponding to said stored pixels of each of said color planes of said color image;

means for averaging said plurality of histograms to form a composite histogram;

means for processing said composite histogram with a non-linear function so that small histogram values have relatively more contribution to said tone correction function, and large histogram values have relatively less contribution to said tone correction function, said non-linear function comprising raising each histogram value to a power between 0 and 1;

means for numerically integrating said processed histogram;

means for normalizing said numerically integrated histogram to extend over the desired range of tone values in interest in order to form said tone correction function;

means for storing said tone correction function in a lookup table memory; and means for applying said stored plurality of pixels of one of said color planes in said memory to said lookup table memory to provide a plurality of tone corrected image output pixels from said lookup table memory corresponding to said tone corrected image.

18. In an automatic tone correction system wherein a color image is stored in the form of a plurality of color planes, said color image being processed by applying a tone correction function to each pixel of said stored color planes, an apparatus for generating a tone corrected image from said stored image, comprising:

means for compiling a histogram of the relative occurrence of tone values corresponding to said stored pixels of each of said color planes of said color image;

means for averaging said plurality of histograms to form a composite histogram;

means for processing said composite histogram with a non-linear function so that small histogram values have relatively more contribution to said tone correction function, and large histogram values have relatively less contribution to said tone correction function, wherein said processing means further comprises means for computing the square root of each tone value;

means for numerically integrating said processed histogram;

means for normalizing said numerically integrated histogram to extend over the desired range of tone values in interest in order to form said tone correction function;

means for storing said tone correction function in a lookup table memory; and means for applying said stored plurality of pixels of said color planes in said memory to said lookup table memory to provide a plurality of tone corrected image output pixels from said lookup table memory corresponding to said tone corrected image.

* * * * *